United States Patent
Barra

(10) Patent No.: US 11,002,207 B2
(45) Date of Patent: May 11, 2021

(54) METHOD FOR SETTING AN IGNITION POINT OF A DRIVE DEVICE AND A CORRESPONDING DRIVE DEVICE UTILIZING THE METHOD

(71) Applicant: AUDI AG, Ingolstadt (DE)

(72) Inventor: Bernd Barra, Munich (DE)

(73) Assignee: AUDI AG, Ingolstadt (DE)

( * ) Notice: Subject to any disclaimer, the term of this patent is extended or adjusted under 35 U.S.C. 154(b) by 394 days.

(21) Appl. No.: 15/701,820

(22) Filed: Sep. 12, 2017

(65) Prior Publication Data

US 2018/0073455 A1 Mar. 15, 2018

(30) Foreign Application Priority Data

Sep. 14, 2016 (DE) .......................... 102016011069.4

(51) Int. Cl.
*F02D 41/10* (2006.01)
*F02D 41/00* (2006.01)
(Continued)

(52) U.S. Cl.
CPC .............. *F02D 41/10* (2013.01); *F02B 37/18* (2013.01); *F02D 9/02* (2013.01); *F02D 37/02* (2013.01);
(Continued)

(58) Field of Classification Search
CPC ........ F02D 37/02; F02D 41/0007; F02D 9/02; F02D 2250/22
See application file for complete search history.

(56) References Cited

U.S. PATENT DOCUMENTS

| 5,765,527 A | * | 6/1998 | Lehner | .................... | F02D 37/02 |
| | | | | | 123/339.1 |
| 6,131,546 A | * | 10/2000 | Vogt | ........................ | F02D 37/02 |
| | | | | | 123/339.14 |

(Continued)

FOREIGN PATENT DOCUMENTS

| DE | 4232973 A1 | 4/1994 |
| DE | 102005005559 A1 | 8/2006 |

(Continued)

OTHER PUBLICATIONS

German Search/Examination (DPMA) report dated Mar. 3, 2017. (German language only, 12 pages).

*Primary Examiner* — Audrey K Bradley
*Assistant Examiner* — Edward Bushard
(74) *Attorney, Agent, or Firm* — Maier & Maier, PLLC

(57) ABSTRACT

A method for operating a drive device with an internal combustion engine and an exhaust gas turbocharger associated with an internal combustion engine. The internal combustion engine is connected to an intake tract provided with a throttle valve. A specified ignition point is determined from a rotational speed of an internal combustion engine. At the same time with a target load jump of the internal combustion engine from an actual torque to a target torque with a full opening of the throttle valve by setting a first target ignition point which is later than the specified ignition point, a target reserve is built up and the actual torque is increased at the same time. The target reserve is used prior to reaching the target torque with the actual torque by setting a second target ignition point which is earlier than the first ignition point, and in addition is used to increase the actual torque.

10 Claims, 2 Drawing Sheets

(51) Int. Cl.
    *F02D 37/02*     (2006.01)
    *F02B 37/18*     (2006.01)
    *F02D 9/02*     (2006.01)
    *F02P 5/145*     (2006.01)
    *F02P 5/15*     (2006.01)

(52) U.S. Cl.
    CPC .......... *F02D 41/0007* (2013.01); *F02P 5/145* (2013.01); *F02D 2250/21* (2013.01); *F02D 2250/22* (2013.01); *F02P 5/1504* (2013.01); *F02P 5/1516* (2013.01); *Y02T 10/12* (2013.01)

(56) References Cited

U.S. PATENT DOCUMENTS

| | | | |
|---|---|---|---|
| 7,650,219 B2 * | 1/2010 | Livshiz | F02D 11/105 701/101 |
| 7,788,024 B2 * | 8/2010 | Livshiz | F02D 31/001 701/114 |
| 8,473,179 B2 * | 6/2013 | Whitney | F02D 13/0207 701/102 |
| 8,631,783 B2 * | 1/2014 | Wang | F02D 41/003 123/406.24 |
| 9,347,381 B2 * | 5/2016 | Long | F02D 23/00 |
| 9,347,387 B2 * | 5/2016 | Heintze | B60T 17/22 |
| 9,388,754 B2 * | 7/2016 | Cygan, Jr. | F02D 41/1497 |
| 9,541,019 B2 * | 1/2017 | Verdejo | F02D 41/04 |
| 9,863,337 B2 * | 1/2018 | Ramappan | F02D 37/02 |
| 9,890,694 B2 * | 2/2018 | Kondo | F02D 41/1456 |
| 2011/0139117 A1 * | 6/2011 | Kar | F02D 31/001 123/395 |

FOREIGN PATENT DOCUMENTS

| | | |
|---|---|---|
| DE | 102006029370 A1 | 1/2008 |
| DE | 102009020536 A1 | 1/2010 |
| DE | 102011107121 A1 | 1/2013 |
| DE | 102013219457 A1 | 3/2015 |
| DE | 102013111358 A1 | 4/2015 |
| DE | 102014220400 A1 | 4/2016 |
| EP | 0770177 B1 | 5/2000 |

* cited by examiner

METHOD FOR SETTING AN IGNITION POINT OF A DRIVE DEVICE AND A CORRESPONDING DRIVE DEVICE UTILIZING THE METHOD

TECHNICAL FIELD

The invention relates to a method for operating a drive device provided with an internal combustion engine and with a gas exhaust turbocharger associated with the internal combustion engine, wherein the internal combustion engine is equipped with an intake tract having a throttle valve, and wherein a specified ignition point is determined from a rotational speed of the internal combustion engine. The invention further relates to a drive device.

BACKGROUND

The drive device serves to provide a drive torque, which is directed for example to drive a motor vehicle. In the latter case, the drive device is assigned to the motor vehicle or installed in it. In order to provide the drive torque, the drive device is provided with the internal combustion engine which provides the drive torque at its crankshaft. To increase the power and/or to increase the efficiency of the internal combustion engine, the latter is assigned to an exhaust gas turbocharger. The exhaust gas turbocharger is provided with a turbine as well as with a compressor, which are preferably mechanically coupled to each other. Other coupling types can be also realized. For example, the turbine and the compressor can be coupled electrically. As an alternative, the mechanical coupling can be provided so that it can be electrically supported by the exhaust gas turbocharger. In this case, an electric machine is operationally connected to the compressor, which can be operated to support the condenser.

To the exhaust gas turbocharger is supplied the exhaust gas that is generated by the internal combustion engine during its operation. The turbine uses the enthalpy contained in the exhaust gas and/or the flow energy of the exhaust gas to operate the condenser. This in turn compresses fresh gas, and it thus brings it from a first pressure level to a higher second pressure level in order to supply it subsequently to the internal combustion engine. Under the term fresh gas is to be understood for example fresh air, a mixture of exhaust gas and fresh air, and the like.

The fresh gas that is condensed by means of the condenser is supplied to the intake tract of the internal combustion engine. In this internal combustion engine is provided a throttle valve. The throttle valve serves to adjust the exhaust gas mass flow supplied to the internal combustion engine. The throttle valve or the degree of opening of the throttle valve is adjusted according to the operating point of the internal combustion engine. The operating point is characterized for instance by the actual rotational speed of the internal combustion engine and/or by the actual torque of the internal combustion engine that is in fact provided by the internal combustion engine.

During the operation of the internal combustion engine it is necessary to ignite the fresh gas-fuel mixture introduced into at least one cylinder of the internal combustion machine. This is carried out at a determined actual igniting point. This refers to a point in time at which the igniting of the mixture in fact takes place. On the other hand, at the internal combustion engine is set a target ignition point. It is evident that minor deviations may occur that will be within the tolerances.

The actual ignition point is determined for example from the specified ignition point. This specified ignition point is determined from the actual rotational speed of the internal combustion engine. Normally, the earlier the specified ignition point, the higher the rotational speed of the internal combustion engine. This is due to the fact that the mixture located in the cylinder requires a certain period of time for the actual ignition and/or combustion. In order to achieve the desired effect within the context of the combustion, in particular a certain gas pressure in the cylinder, the specified ignition point and ideally also the target ignition point must be adapted to the rotational speed of the internal combustion engine. The specified ignition point is thus to this extent present at least as a function of the rotational speed of the internal combustion engine. In a normal operation of the internal combustion engine or of the drive device, the target ignition point corresponds to the specified ignition point.

As the degree of charging of the internal combustion engine is increased while the cylinder capacity is at the same time reduced, the spontaneity of the internal combustion engines deteriorates noticeably. The difference between the point in time of the specification of a target torque and the point in time at which the drive device or the internal combustion engine provides an actual torque corresponding to this desired torque is thus increased. This effect is also known as "turbo lag". For this reason, it can be provided at least in one operating state of the drive device that the exhaust gas charger is biased, which is to say that the drive device is operated in such a way as if the actual torque is the same as the as the one provided when the charging pressure is increased by the condenser, so that the consequent increase of the rotational speed of the combustion engine can take place faster.

From prior art is known for example the document DE 10 2005 005 559 A1. This document relates to a method for operating an internal combustion engine, in particular a gasoline engine, in particular of a motor vehicle which is provided with a gas exhaust turbocharger, wherein the internal combustion engine is in the operating state "idle" operated with a specified idle rotational speed and with respect to the fuel consumption or to idle operations with optimized idle operation parameters, in particular for the ignition point and for fuel injection. In this manner, at least in one partial portion of the operating state "idle", the rotational speed of the exhaust gas turbocharger is increased at least in a temporal subregion of the operating state "idle" by setting a operating parameter of the internal combustion engine with gas exhaust enthalpy that deviates from idle operating parameters.

Furthermore, the document DE 10 2011 107 A1 discloses a method and an arrangement for operating a drive train of a motor vehicle, the document DE 10 2009 020 536 A1 discloses a method for managing transitions to lean air/fuel with a coordinated torque control, the document DE 42 32 973 A1 discloses a method for adjusting the torque of a gasoline engine during a switching step, the document DE 10 2013 111 358 A1 discloses a method and a device for controlling an internal combustion engine of a motor vehicle and the document DE 10 2014 220 400 A1 discloses a method for determining a torque reserve.

SUMMARY

The object of the invention is to propose a method for operating a drive device as well as a drive device which have advantages over the known methods and over the known drive devices, in particular by enabling an even faster increase of the rotational speed of the internal combustion engine.

This is achieved in accordance with the invention with a method and with a drive device according to the disclosure. At the same time, it is provided that with the target load jump of the internal combustion engine from an actual torque to a target torque with full opening of the throttle and with the setting of a first target ignition timing, which is later than the specified ignition torque, a torque reserve is built up and the actual torque is increased, wherein the torque reserve is used prior to reaching the target torque by the current torque with the adjustment of a second target ignition point, which occurs earlier than the first target ignition point, in order to further increase the target torque.

Before the target load jump occurs, the drive device is preferably operating in the normal operations described above, only when the target load jump occurs, which is to say with the setting of the target torque deviating from the actual torque, suitable measures are taken to improve the acceleration of the internal combustion engine. The target load jump is in particular provided when the target torque is greater than the actual torque that is momentarily provided to the drive device or to the internal combustion engine, for example significantly greater. It is preferred when the target load jump is only present or is only detected if the target torque is at least by 25%, at least by 50%, at least by 75%, or at least by 100% greater than the actual torque.

If the target load jump of the internal combustion engine has been detected, the throttle valve is completely opened. The opening leads to an acceleration of the internal combustion engine, which is to say on the one hand to an increase of the rotational speed of the internal combustion engine, and on the other hand to an increase of the turbocharger rotational speed of the gas exhaust turbocharger. The latter will on the one hand result in an increased amount of exhaust gas supplied by the turbine to the exhaust gas turbocharger, which is on the other hand caused by the decrease of the pressure resulting from pressure accumulation.

In addition, a target ignition point corresponding to the first target ignition point is to be set for the internal combustion engine. This is later determined as the specified ignition point, which is also determined from the rotational speed of the internal combustion engine. The first ignition point is therefore shifted to a later point in time so that the ignition of the mixture located in the cylinder takes place later. The torque reserve is thus built up in this manner.

However, the first target ignition point should be selected in such a way that the actual torque is increased at the same time, and so that the rotational speed of the internal combustion engine is also increased. It is therefore not provided that only biasing of the gas exhaust turbocharger is carried out in preparation for such an acceleration, but instead the torque reserve is built up at the same time and the target torque is increased. In other words, the biasing of the gas exhaust turbocharger is integrated in the acceleration process of the internal combustion engine.

With such an approach, excellent gas exhaust values are obtained in the form of small gas exhaust emissions of the internal combustion engine in spite of the high acceleration that can be achieved. This includes in particular a significant reduction in the emissions of nitric oxide. The latter is particularly welcome if the internal combustion engine is designed as a diesel internal combustion engine because such an engine has high nitrogen oxide emissions of the load built up when compared to a gasoline internal combustion engine. As an alternative, the internal combustion engine can be of cause also designed as a gasoline internal combustion engine.

After the opening of the throttle valve and the setting of the first target ignition point, which is to say after building up the torque reserve, this is then used to further increase the actual torque of the internal combustion engine. For this purpose, the target ignition point of the internal combustion engine is set to the second target ignition point, or the second target ignition point is set to the internal combustion engine. This second ignition point is earlier than the first target ignition point, so that in other words, the ignition point is shifted again to an earlier point starting from the first target ignition point. This causes a reduction of the torque reserve, or a conversion of the torque reserve into a real actual torque that is generated by the internal combustion engine.

During the increase of the actual torque in the direction of the target torque or until it is reached, the target ignition point is set within the method according to the invention so that it is set first to a later point and then again to an earlier point. In this manner, the gas exhaust turbocharger is first accelerated, and the torque reserve that is built up during the acceleration of the gas exhaust turbocharger is then used to accelerate the internal combustion engine. The result is an improvement of the transient behavior of the drive device or of the internal combustion engine, as well as the already described reduction of the emissions of raw nitric oxide. If the nominal power of the drive device remains the same, its behavior in response can be clearly improved, so that on the whole, the target conflict between a higher nominal output and a good response behavior is broken up.

Within the scope of another embodiment it is provided that the first target ignition point is changed over starting from the preset ignition point over a specific period of time, and/or the second target ignition point is changed over starting from the first target ignition point over a specific second period of time. It is preferred when simultaneously with the opening of the throttle valve, but at least still immediately thereafter, the first ignition point is changed starting from the preset ignition point.

However, the first ignition point is in this case not set abruptly to a final value, which it displays before the torque reserve is used for another increase of the actual torque. Instead, the change of the first target ignition point takes place over a specific period of time, in particular preferably starting from a starting value until the final value. The starting value can in this case correspond to the specified ignition point, or it can slightly deviate from it, in particular with an infinitesimal deviation, and it is different from it, preferably occurring later than the specified ignition point.

In addition or as an alternative, the conduct is analogous with the second target ignition point. Also in this case, the value is changed starting from a starting value until an end value, which is to say over the second time period. The starting value of the second target ignition point corresponds in this case to the ending value of the first target ignition point, or it can slightly deviate from it, in particular with an infinitesimal deviation, and it is different from it, preferably occurring earlier.

Within the scope of another preferred embodiment of the invention, the change of the first target ignition point and/or of the second target ignition point takes place in steps or continuously. In other words, both starting ignition points, which is to say the first ignition point and the second ignition point or each individual point among them, is changed either in discrete steps or continuously. The stepwise change takes place preferably in a plurality of steps during each respective specific time period, which is to say during the first or during the second time period. The number of the steps in this case corresponds preferably to at least three, at least four, at least five, at least ten or more steps.

According to another embodiment of the invention, the first time period with the target load jump starts with the target load jump and it ends before the target torque is reached with the actual torque, in particular upon reaching a turbocharger target rotational speed with the rotational speed of the turbocharger. The first time period during which the first target ignition point is changed begins at a specific first point and ends at a specific second point. The first point in time coincides with the occurrence of the target load jump, while the second point in time occurs before the torque is reached with the actual torque. For example, when the second point occurs, this means that the first time period ends when the actual rotational speed of the turbocharger of the gas exhaust turbo loader is reached, or has been reached.

According to another preferred embodiment of the invention, the change of the first target ignition point takes place in such a way that the target torque is increased during the first time period. The power of the internal combustion engine that is increased with this increase of the output of the throttle valve is therefore not converted exclusively to an increased enthalpy of its exhaust gas and it is therefore applied to the increase of the rotational speed of the turbocharger.

Instead, the actual torque of the internal combustion engine is also increased. The first target ignition point is adjusted accordingly. In particular, the first target ignition point is adjusted in such a way that during the first time period, a continuous increase of the actual torque takes place, in particular so that there is no decrease of the actual torque and preferably also no constant retention of the actual torque.

It is preferred when the difference existing between the actual torque at the end of the first time period and the actual torque present with the occurrence of the target load jump relative to the difference between the target torque and the actual torque that is present with the occurrence of the target load jump, is at least 10%, at least 20%, at least 25%, at least 30%, at least 40% or at least 50%.

According to another embodiment of the invention, the internal combustion engine is provided with a variable valve drive for influencing a flushing gradient via the internal combustion engine, as well as with a valve overlap of gas exchange valves, wherein the first target ignition point is changed late with respect to the preset ignition point as soon as a positive flushing gradient is present valve overlap of the gas exchange valve. The variable valve drive can thus be used on the one hand to adjust the flushing gradient, and on the other hand also to adjust the valve overlap.

The degree of the valve overlap can be of course selected in such a way that there will be no valve overlap, and so that the gas exchange valves of the cylinder are provided with opening times that are staggered relative to each other. However, it is preferred when the variable valve drive is set so that a valve overlap of the gas exchange valve is present simultaneously with the opening of the throttle valve and with the setting of the first target point, and the opening times of the gas exchange valves overlap each other. In particular, an opening time period of a gas exchange valve configured as an inlet valve overlaps an opening time period of a gas exchange valve configured as an outlet valve.

The first target ignition point should now be selected with respect to the present ignition point in such a way that the positive flushing gradient is present during the valve overlap. This is to be understood so that during the overlapping time period of the opening times of the gas exchange valves, the pressure on an intake side of the internal combustion engine is higher with respect to the respective cylinders than on the outlet side so that the cylinder is flushed through during the valve overlap with fresh gas, which flows from the inlet side to the outlet side of the cylinder. In other words, the first target ignition point is to be shifted so that it occurs later relative to the specified ignition point when the positive flush gradient is present or when it is detected.

It is in this case particularly preferred when the change of the first target ignition point takes place in such a way that the positive flushing gradient is also present further on. In particular, it is provided that the first target ignition point is set back so far when the positive flush gradient is present that the positive flush gradient is still present, or that it is no longer present, but so that no negative flush gradient will occur in either case. In other words, the first target ignition point is adjusted to a later point in such a way that no negative flush gradient is present. The modification of the first target ignition point preferably takes place in several steps, wherein each step is select such that the condition explained above applies. The procedure described above can be in principle provided independently of the presence of the variable valve drive.

According to another embodiment of the invention, the second time period follows immediately after that the first time period and it ends with the target torque when the target torque is reached. In other words, the adjustment of the target ignition point starts at the second target ignition point or at its change, immediately after the end of the first time period, and it ends as soon as the actual torque reaches or has reached to target torque. It is therefore preferred when also the change of the second target ignition point is completed exactly when the second point ends or when the actual torque corresponds to the target torque.

According to a preferred embodiment of the invention, the second target ignition point is changed during the second time period in the direction of the specified ignition point, so that at the end of the second time period, the second target ignition point corresponds to the specified ignition point. At the end of the second time period or immediately after the end of the second time period, the internal combustion engine is thus again operated in the normal operation state in which the target ignition point set for the internal combustion engine corresponds to the specified ignition point of the target ignition point. For this purpose, the second target ignition point is changed during the second time period in the direction of the specified ignition point, wherein this change is concluded with the end of the second time period such that the second target ignition point is the same as the specified ignition point.

Finally, in the context of another embodiment of the invention, the gas exhaust turbocharger is provided with a bypass line bypassing a turbine of the gas exhaust turbocharger, which is closed when the target load jump occurs. The bypass line serves to circulate the exhaust gas generated by the internal combustion engine. The bypass line can thus be also referred to as a waste gate.

In the bypass line is arranged a switching valve by means of which the bypass line can be selectively opened or closed.

In other words, the bypass line can be closed by means of the switching valve. Such a closing of the bypass line is provided as soon as the target load jump occurs, so that after the occurrence of the target load jump, all of the exhaust gas generated by the internal combustion engine passes through the turbine of the exhaust gas turbocharger. After the end of the second time period it can be provided that the bypass line is released again. For this purpose, the switching valve is adjusted accordingly.

The invention further relates to a drive device, in particular for carrying out the method described above with an internal combustion engine and with a gas exhaust turbocharger, wherein the internal combustion engine is provided with an intake tract having a throttle valve, and wherein a specified ignition point is determined from an actual rotational speed of an internal combustion engine. In this case it is provided that the drive device is adjusted so that a torque reserve is built up and the actual torque is increased at the same time with the first target load jump of the internal combustion engine, from an actual torque to a target torque, with a complete opening of the throttle valve and with the setting of a first target ignition point that occurs later than the specified ignition point, wherein the torque reserve is used prior to reaching the target torque with the actual torque by setting a second target ignition point, which occurs earlier than the target ignition point, which is also used to increase the actual torque.

The advantages of such a method or of such an embodiment of the drive device have been already mentioned. Both the drive device and the method can be further developed in accordance with the embodiments described above, so that reference is made to them in this regard.

BRIEF DESCRIPTION OF THE FIGURES

The invention will be next described in more detail with reference to the embodiment illustrated in the figures, without limiting the invention. The figures show the following.

DETAILED DESCRIPTION

Figure 1:
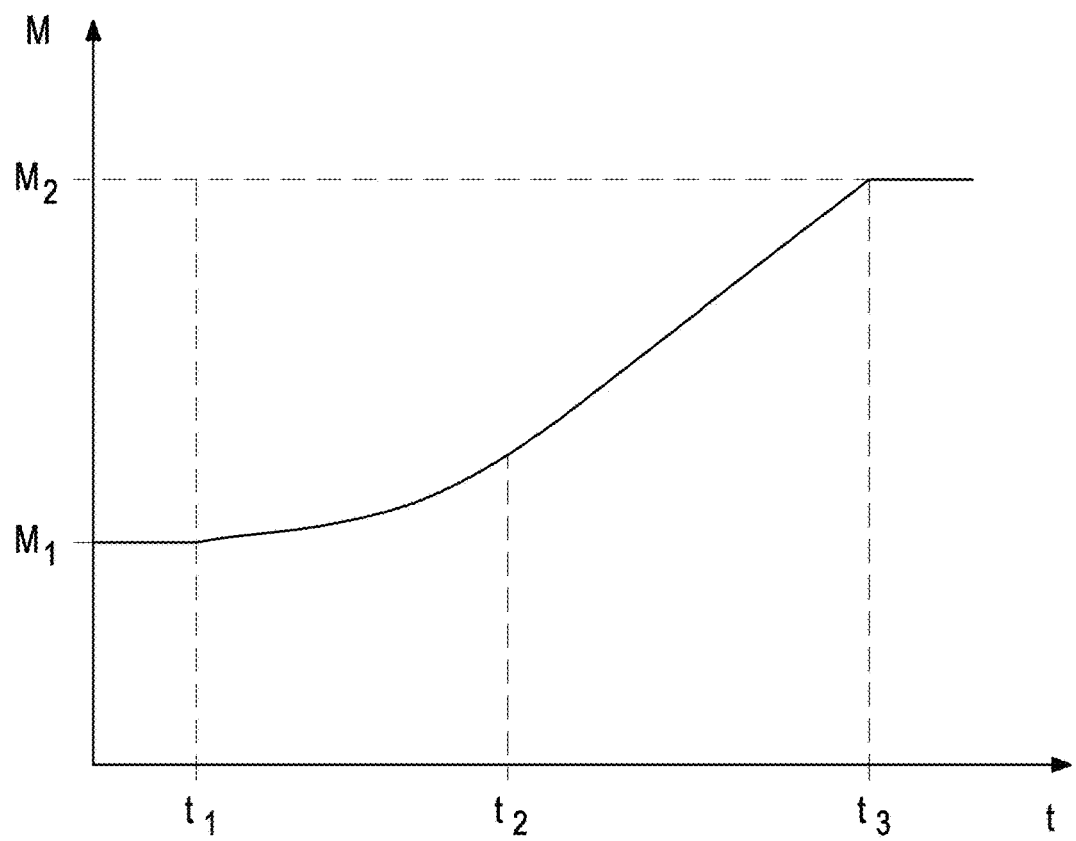
FIG. 1 shows a diagram in which a torque provided by a drive device is plotted against time.
Figure 2:
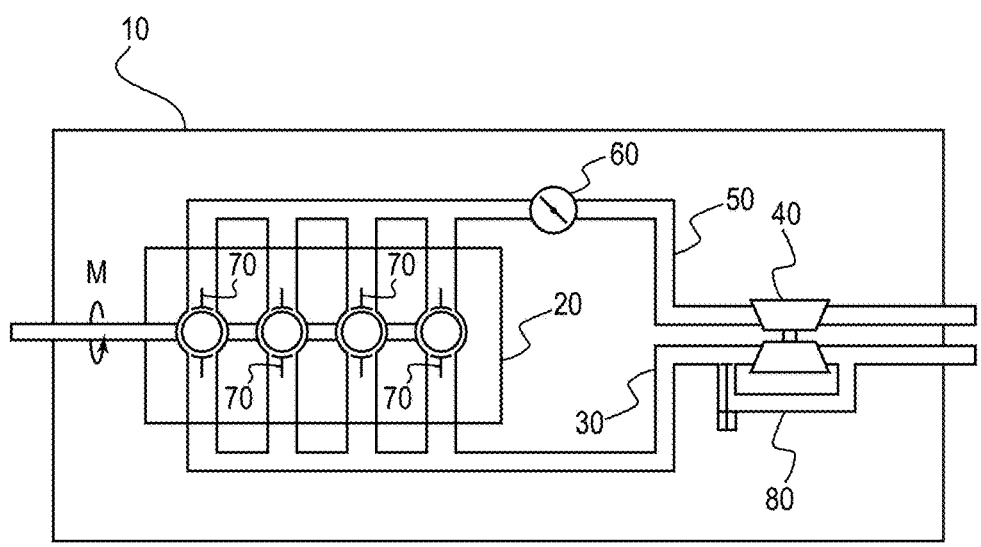
FIG. 2 shows a schematic representation of an exemplary embodiment of a drive device.
Figure 3:
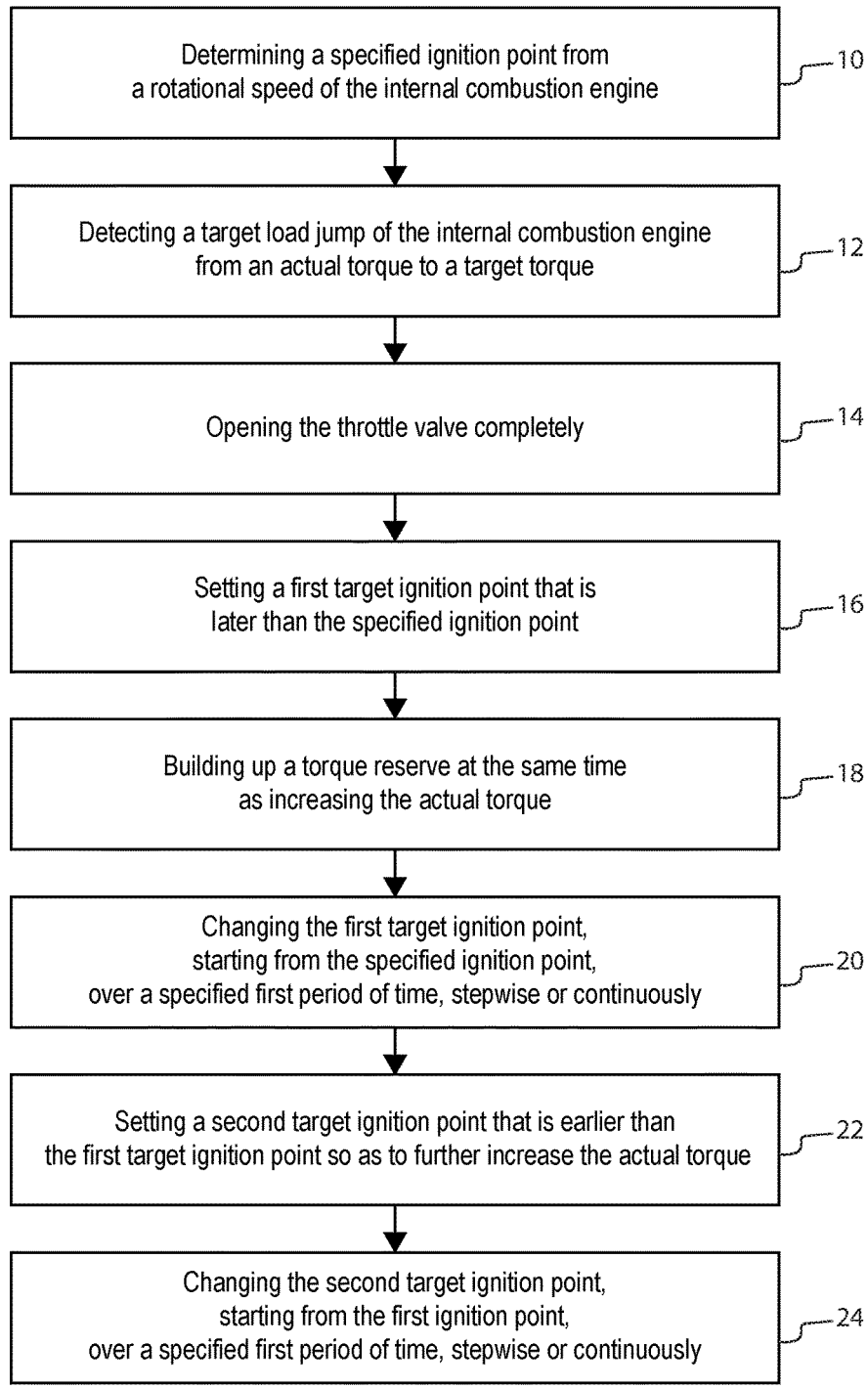
FIG. 3 shows an exemplary method for setting an ignition point of a drive device.

FIG. 1 shows a diagram in which a torque M that is provided by a drive device is plotted against time T. FIG. 2 shows a schematic representation of a drive device 10. The drive device 10 is equipped with an internal combustion engine 20 as well as with a gas exhaust turbocharger 40 which is associated with the internal combustion engine 20. The internal combustion engine is connected via a throttle valve 60 to an intake tract 50. The internal combustion engine 20 may also be provided with a variable valve drive 70 and the gas exhaust turbocharger may also be provided with a bypass line 80. As shown in FIG. 3, during the operation of the drive device or of the internal combustion engine, at step 10, a specified point in time is to be determined for the ignition of the internal combustion engine from the rotational speed of the internal combustion engine.

It is evident from the graph shown in the diagram that the internal combustion engine is operated at a point in time $t<t_1$ with a constant actual torque $M_1$. This means that the actual torque corresponds to a target torque and accordingly, no change will occur in the actual torque. At the point in time $t=t_1$, a target load jump of the internal combustion engine occurs. This means that the target torque is increased, in particular abruptly or in the form of a torque jump, which in the embodiment illustrated here falls on the torque $M_2$.

This target torque is set on the internal combustion engine so that the actual torque of the internal combustion engine is subsequently increased in order to set it again according to the target torque. The target load jump can be detected at step 12. In this case it is provided that with the target load jump of the internal combustion engine, the throttle valve is at first fully opened at step 14. In addition, at step 16, the target ignition point of the internal combustion engine is set to a first target internal ignition point, which is later than the specified ignition point. A torque reserve is thus built up in this manner, at step 18. However, also at step 18, at the same time it is provided that the actual torque is increased.

The procedure is provided during a first time period, which in the embodiment illustrated here corresponds to the time period $t_1 \leq t \leq t_2$. During the first time period, at step 20, the first target ignition point is changed starting from the specified point, in particular for example in steps or continuously. It is preferred when the first target ignition point is in this case changed immediately at the beginning of the first time period and/or immediately at the end of the first time period. It can be clearly seen that the actual torque of the internal combustion engine or of the drive device is continuously increased during the first time period.

Immediately after the first time period follows a second time period, to which applies $t_2 \leq t \leq t_3$. During the second time period, at step 22, the target point of the internal combustion engine is set to a second target ignition point, which occurs earlier than the first ignition point, in particular earlier than the first target ignition point at the end of the first time period. With this adjustment, the target reserve is used to further increase the torque. As a result, the actual torque is also increased in the second time period as can be seen from the diagram.

Overall, the torque of the internal combustion engine is continuously being increased both during the first time period and also during the second time period. For this purpose, the target ignition point is set first during the first time period in the direction of occurring later, in particular stepwise or continuously, and after that, at step 24, during the second time period again for occurring earlier, preferably stepwise or continuously. This enables an efficient and rapid increase of the actual torque, in particular with a low exhaust emission at the same time.

The invention claimed is:

1. A method for operating a device that provides a driving torque, the device having an internal combustion engine, a gas exhaust turbocharger associated with the internal combustion engine, and an intake tract connected to the internal combustion engine via a throttle valve, comprising the consecutive steps of:

in a first step, determining a specified ignition point from a rotational speed of the internal combustion engine;

in a second consecutive step, detecting a target load jump of the internal combustion engine from an actual torque to a target torque;

in a third consecutive step, upon and in response to detection of said target load jump, setting the throttle valve to a completely open condition and opening the throttle valve completely and simultaneously or immediately thereafter setting a first target ignition point, the first target ignition point being later than the specified ignition point, so as to build up a torque reserve at the same time as continuously increasing the actual torque over a specified first period of time; and in a fourth consecutive step, setting a second target ignition point so as to further continuously increase the actual torque by using the torque reserve, over a specified second period of time, the second target ignition point being earlier than the first target ignition point;

wherein, by setting the second target ignition point, the torque reserve is used prior to reaching the target torque with the actual torque.

2. The method according to claim 1, wherein:

the internal combustion engine is provided with a variable valve drive for influencing a flushing gradient via the internal combustion engine as well as valve overlapping of gas exchange valves of the internal combustion engine; and wherein the first target ignition point is changed towards later with respect to the specified ignition point as soon as a positive flushing gradient is present during the overlap of the gas exchange valve.

3. The method according to claim 1, wherein:

the first target ignition point is changed over, starting from the specified ignition point, over the specified first period of time; and the second target ignition point is changed over, starting from the first target ignition point, over the specified second period of time.

4. The method according to claim 3, wherein the change of the first target ignition point and the second target ignition point takes place stepwise or continuously.

5. The method according to claim 3, wherein the first time period begins with the target load jump and ends prior to reaching the target torque with the actual torque.

6. The method according to claim 3, wherein the change of the first target ignition point takes place in such a way that the actual torque is increased during the first time period.

7. The method according to claim 3, wherein the second time period directly adjoins the first time period and ends upon reaching the target torque with the actual torque.

8. The method according to claim 3, wherein the second target ignition point is changed during the second time period in the direction of the specified ignition point, so that at the end of the second target ignition point, the target ignition point corresponds to the specified ignition point.

9. The method according to claim 3, wherein the gas exhaust turbocharger is provided with a bypass line bypassing a turbine of a gas exhaust turbocharger, which is closed upon the occurrence of the target load jump.

10. A device that provides a driving torque, comprising:

an internal combustion engine;

an exhaust turbocharger associated with the internal combustion engine;

wherein a specified ignition point is determined from a rotational speed of the internal combustion engine;

wherein the device is adapted to perform the consecutive steps of:

in a first step, determining a specified ignition point from a rotational speed of the internal combustion engine;

in a second consecutive step, detecting a target load jump of the internal combustion engine from an actual torque to a target torque;

in a third consecutive step, upon and in response to detection of said target load jump, setting the throttle valve to a completely open condition and opening the throttle valve completely and simultaneously or immediately thereafter setting a first target ignition point, the first target ignition point being later than the specified ignition point, so as to build up a torque reserve at the same time as continuously increasing the actual torque over a specified first period of time;

in a fourth consecutive step, setting a second target ignition point so as to further continuously increase the actual torque by using the torque reserve, over a specified second period of time, the second target ignition point being earlier than the first target ignition point; and wherein, by setting the second target ignition point, the torque reserve is used prior to reaching the target torque with the actual torque.

* * * * *